United States Patent [19]

Beaumont

[11] 4,401,678

[45] Aug. 30, 1983

[54] PRODUCTION OF WINE

[75] Inventor: Ronald E. Beaumont, Delta, Canada

[73] Assignee: Jordan & Ste-Michelle Cellars Ltd., St. Catharines, Canada

[21] Appl. No.: 319,973

[22] Filed: Nov. 10, 1981

[51] Int. Cl.$^3$ .............................................. C12G 1/00
[52] U.S. Cl. ...................................... 426/15; 426/387; 426/490
[58] Field of Search ......................... 426/387, 490, 15

[56] References Cited

U.S. PATENT DOCUMENTS

| | | | |
|---|---|---|---|
| 4,083,779 | 4/1978 | Combe et al. ........................ | 426/15 |
| 4,322,448 | 3/1982 | Matsuura et al. ................... | 426/387 |

FOREIGN PATENT DOCUMENTS

| | | | |
|---|---|---|---|
| 2339206 | 3/1975 | Fed. Rep. of Germany ........ | 426/15 |
| 2523720 | 12/1975 | Fed. Rep. of Germany ........ | 426/15 |
| 2443503 | 8/1980 | France .................................. | 426/490 |
| 48-32356 | 10/1973 | Japan .................................... | 426/15 |
| 55-8147 | 3/1980 | Japan .................................... | 426/15 |

OTHER PUBLICATIONS

Amerine et al., The Technology of Wine Making, 3rd Ed., The Ari Pub. Co., Inc., Westport, Conn. 1972 (pp. 60, 61, 84, 85, 112, 113, 392, 393, 488, 489, 498, 499, 670+671).

*Primary Examiner*—David M. Naff
*Attorney, Agent, or Firm*—Sim & McBurney

[57] ABSTRACT

The Labrusca Flavour Index (LFI) of grape wine made from Labrusca grapes is decreased substantially by subjecting grape juice or wine produced from the grape juice to reverse osmosis with a semi-permeable membrane at ambient temperatures to cause the low molecular weight volatile esters, especially methyl anthranilate, to pass through the semi-permeable membrane. The reverse osmosis usually is effected with a membrane having a molecular weight cut-off of about 200 which enables colorants and sugars to be retained. By decreasing the LFI value of the wine, larger proportions may be used to blend with less proportions of higher quality Vinifera wines.

8 Claims, No Drawings

PRODUCTION OF WINE

FIELD OF INVENTION

The present invention relates to the production of grape wine.

BACKGROUND OF THE INVENTION

In the Niagara Peninsula, Ontario, Canada and in other wine grape-growing regions, such as Upper New York State, U.S.A., a significant tonnage of wine grapes of the Labrusca type are harvested which produce a "foxy" flavour when used in wine production. Wines made directly from these grapes have been judged to be inferior to grape wines produced from other grapes which do not impart this flavour.

The flavour is known to result from the presence of certain volatile esters in the wine, mainly methyl anthranilate. The presence of these volatile esters had led to the establishment of a Labrusca Flavour Index (LFI) which is determined by the expression:

$$LFI = 100 \times \text{concentration of methyl anthranilate (in ppm)} + \text{concentration of total volatile esters (in ppm)}.$$

The relative proportions of the various volatile esters present in the grape juice formed from the grapes depends on the variety of grape and the timing of the harvesting of the grape. The total concentration of volatile esters can be in the range of about 200 to about 500 ppm for Labrusca varieties, with later harvesting providing higher concentrations of the volatile esters.

The Labrusca grape has been the predominant wine grape crop of the Niagara Peninsula and the high LFI values of wines produced therefrom has inhibited sales of such wine. Often, a significant proportion of the high LFI wine is blended with low LFI wines, such as, those produced from Vinifera hybrid grapes, to decrease the overall LFI value. In addition, with the increase in recent years of the production of wines from Vinifera grapes and the acceptability of these higher priced wines in the market place, surplus wine production from Labrusca grapes has resulted.

The Labrusca hybrid and French hybrid grapes are now the predominant table wine grapes of the Niagara Peninsula. While many of these varieties contain little or no methyl anthranilate and only minimal levels of total volatile esters, their nature is such that their flavour profile predominates limiting their use in quality table wines.

The following Table I gives typical values of MA and TVE for grapes typically used in making high flavoured wines:

TABLE I

| Grape | MA (ppm) | TVE (ppm) |
|---|---|---|
| (a) American varieties | | |
| Concord | 3.37 | 104 |
| Niagara | 2.57 | 49 |
| Catawba | 0.21 | 43 |
| Delaware | 0.33 | 4 |
| Elvira | 0.07 | 12 |
| (b) Vineland hybrids | | |
| Ventura | 0.02 | 4 |
| (c) French hybrids | | |
| De Chaunac | 0.01 | 4 |
| Maréchal Foch | 0.01 | 5 |

Wines produced from Labrusca hybrid grapes and French hybrid grapes can have good storage qualities and other attributes which make them a desirable product. The problem to which the present invention is directed is the production of Labrusca grape wines of lower LFI values and the production of Labrusca hybrid and French hybrid grape wines of lower flavour, while retaining the attributes of such wines, and thereby overcome the prior art problems mentioned above.

SUMMARY OF THE INVENTION

In accordance with the present invention, grape juice or wine produced therefrom is subjected to reverse osmosis using a membrane having a molecular weight cut-off which permits flavourants to pass therethrough while retaining higher molecular weight components, thereby to form a retentate having a lowered flavour profile.

GENERAL DESCRIPTION OF INVENTION

The present invention usually is effected on the grape juice produced from Labrusca hybrid grapes or other grapes which produce highly flavoured wine, such as French hybrid grapes, prior to fermentation, although the process is equally effective in decreasing the flavour profile when carried out on wine produced from the grapes. The process is described hereinafter mainly with respect to grape juices.

The reverse osmosis results in volatile esters of low molecular weight including methyl anthranilate and other flavourants passing through the membrane while the higher molecular weight sugars and other components are retained in the grape juice. The molecular weight cut-off of the membrane is chosen to maximize the loss of volatile esters while minimizing the loss of sugars from the grape juice.

The volatile esters and other flavourants which are present in the grape juice in significant quantities have a molecular weight less than about 175, while the sugars have molecular weights generally in the range of about 180 to about 360. While those values indicate that a membrane of molecular weight cut off of about 175 provides the ideal combination of flavourant permeation and sugar retention, for practical reasons of membrane availability, the membrane used generally has a nominal molecular weight cut-off of about 200.

The colourants which are present in the grape juice or wine are relatively high molecular weight species and mainly remain in the retentate, so that the addition of colourants, especially in the case of red juice or wine, is unnecessary.

The reverse osmosis procedure also tends to remove acid components from the juice. This result is beneficial in that acid levels in the grapes of interest to this invention usually are too high for wine making and deacidifying often is required. The reverse osmosis procedure of this invention, therefore, decreases the necessity for deacidification.

The reverse osmosis usually is effected at ambient temperatures, usually ranging from about 15° to about 25° C., with sufficient pressure being applied to the juice to achieve a desired flow rate through the membrane. Since the juice usually has a relatively high sugar concentration, usually in the range of about 10 to about 25% by weight, the presence required to be exerted usually is in the range of about 500 to about 1000 psi.

The ability to use ambient temperatures for carrying out the removal of the volatile esters and other flavourants in this invention is beneficial, since no thermal stress is applied to the grape juice or wine, and hence the shelf life of the product wine is not impaired.

The term "reverse osmosis" as used herein is intended to include not only procedures in which the grape juice or wine is concentrated to a lower volume but also procedures in which the grape juice or wine is maintained at the same volume by the addition of further aqueous medium to the grape juice or wine at a rate equal to the flow rate through the membrane, and hence includes both ultrafiltration and diafiltration.

In the procedure wherein grape juice is permitted to become more concentrated, the sugar concentration of the retentate increases. In the procedure wherein the grape juice is maintained at the same volume, the concentration of sugar remains the same or decreases to some extent as a result of permeation through the membrane.

The proportion of the initial volume of grape juice which is removed by the reverse osmosis depends on a number of factors, mainly the proportion of volatile esters desired to be removed from the grape juice. Any proportion of the initial volume removed decreases the volatile ester concentration of the grape juice. However, as the proportion removed increases, not only is the proportion of volatile esters decreased but also an increasing removal of the desirable sugars occurs. The actual quantity of sugars removed depends on the molecular weight range of the sugars in the grape juice.

A balance of these factors as well as the actual concentration of volatile esters and other flavourants in the grape juice is used to determine the proportion of the initial volume removed in the reverse osmosis for a particular grape juice. Ususally, the proportion of the initial volume removed is about 25 to about 75% by volume, typically about 50% by volume. For the Labrusca varieties, by the reverse osmosis procedure, it is usually attempted to decrease the LFI of the juice by from about 50 to about 100%.

Once the grape juice has been deflavoured using the reverse osmosis step, the deflavoured grape juice is fermented in the conventional manner to produce a wine. The latter wine of much lower overall flavour than is conventionally produced from Labrusca, Labrusca hybrid and French hybrid grape juice may be sold as such, or blended in a much higher proportion with Vinifera grape wines to produce a wine of comparable quality to blended wines currently produced with a much higher proportion of Vinifera grape wines.

When the reverse osmosis process is applied to wine, alcohol passes through the membrane along with the flavourants, so that the permeate assumes a highly-flavoured white wine-like character, which possibly may have utility in blending. The concentrate wine fraction has an intensified depth of colour which is particularly pronounced in the case of red wine, enabling the concentrated red wine to be blended at higher levels with fine hybrid wines and to be used as a colouring wine in a variety of wine products.

EXAMPLES

Example 1

This Example illustrates the application of the invention to juice from red grapes (Concord).

Grape juice from Concord grapes was processed on an experimental ultrafiltration unit utilizing a membrane having a molecular weight cut-off of 200. The procedure was carried out at 74° F. (23° C.) under a pressure of 600 psi, while pure water was added to the retentate at the same rate as filtrate permeated the membrane.

The concentrations (in ppm) of methyl anthranilate (MA) and total volatile esters (TVE) were determined for the grape juice and also for concentrates at various volume removal factors. From these values, the Labrusca Flavour Index was determined in each case.

The results which were obtained are set forth in the following Table I:

TABLE I

| Volume Removal | Analysis | | | |
|---|---|---|---|---|
| | MA (ppm) | TVE (ppm) | LFI | % Removal |
| 0 | 1.99 | 81 | 280 | — |
| 25% | 1.26 | 46 | 172 | 39% |
| 40% | 1.14 | 37 | 151 | 46% |
| 50% | 1.12 | 34 | 146 | 48% |
| 60% | 1.06 | 30 | 136 | 51% |
| 75% | 0.90 | 20 | 110 | 61% |

It will be seen from the above Table I that a significant removal of both methyl anthranilate and total volatile esters, and hence a significant lowering of the Labrusca Flavour Index occurred. Sensory testing of the concentrated grape juice indicated a significantly decreased Labrusca character.

The grape juice had an initial sugar concentration of about 15.7 °Brix and was observed to have lost 1.9 °Brix at the conclusion of the volume removal procedure.

Example 2

This Example illustrates the application of the invention to juice from white grapes (Niagara).

The procedure of Example 1 was repeated on grape juice from Niagara grapes. The results obtained are summarized in the following Table II:

TABLE II

| Volume Removal | Analysis | | | |
|---|---|---|---|---|
| | MA (ppm) | TVE (ppm) | LFI | % Removal |
| 0 | 2.92 | 37 | 330* | — |
| 33% | 1.74 | 26 | 200 | 39% |
| 50% | 1.62 | 23 | 185 | 44% |
| 67% | 1.50 | 18 | 168 | 49% |
| 83% | 1.41 | 15 | 156 | 53% |

*Note: This figure is abnormally high since the grape juice was derived from late-harvested grapes.

As in the case of Example I, a considerable decrease in the Labrusca Flavour Index was attained using the procedure of the invention. The grape juice had an initial sugar concentration of 15.2 °Brix and after ultrafiltration was found to have lost 2 °Brix.

The grape juice sample resulting from the 83% removal was fermented to form white wine utilizing conventional wine making procedures. By sensory testing, the wine was assessed to have a significantly decreased Labrusca character and to be neutral in taste.

Example 3

This Example illustrates the application of the invention to red wine.

Red wine produced by a conventional wine making procedure from Labrusca grapes was subjected to ultrafiltration utilizing a membrane having a molecular weight cut-off of 200. The ultrafiltration was effected at a temperature of 20° C. and under a pressure of 150 psi to decrease the volume of the wine by 50%.

A concentrate of deep red colour and a permeate of light pink were obtained as products. The products as well as the starting wine were analyzed with respect to certain parameters and subjected to sensory testing. The results are reproduced in the following Table III:

TABLE III

|  | Initial Wine | Concentrate | Permeate |
|---|---|---|---|
| Alcohol % v/v | 8.0 | 7.4 | 7.5 |
| Brix | −0.6 | 0.9 | −2.2 |
| RS (Residual Sugar) | 2.3 | 4.2 | 0.05 |
| Total acid g/l | 6.13 | 7.85 | 2.87 |
| pH | 3.30 | 3.36 | 3.1 |
| K (ppm) | 900 | 1420 | 280 |
| Colour | Light red | Deep red | Light pink |

Sensory evaluation of the samples indicated that the concentrate had a significantly-decreased Labrusca character. The deep red neutral concentrate was considered suitable for blending in medium red wine or as a colouring wine in premium red wine. In addition, the deep red neutral concentrate fraction was considered suitable for redilution with water and alcohol by about 50%, while still retaining peak product quality.

The permeate fraction was highly flavoured, possessed a wine character and was adjudged to be suitable for blending to produce rose or 7% wine blending.

SUMMARY OF DISCLOSURE

In summary of this disclosure, the present invention relates to the production of wine of significantly decreased Labrusca Flavour Index by the utilization of reverse osmosis. Modifications are possible within the scope of this invention.

What I claim is:

1. In a process for the production of wine from grapes which produce a highly flavored wine having a high Labrusca Flavor index wherein grape juice is formed from the grapes and wine is formed from the grape juice by fermentation, the improvement which comprises:
    effecting ultrafiltration of said grape juice using a semi-permeable membrane having a molecular weight cut-off of from 175 to 200 so as to permit at least a substantial proportion of low molecular weight volatile esters having a molecular weight lower than 175 to 200 to pass therethrough as a filtrate while retaining essentially all sugars and colorants in the grape juice having a molecular weight greater than 175 to 200 as a grape juice retentate, and
    adding water to the grape juice retentate during said ultrafiltration at a flow rate which is essentially the same as the flow rate of filtrate through the membrane until about 25 to about 75% of the initial volume of the grape juice passes through the membrane to produce a grape juice retentate having essentially the same volume and containing essentially the same amount of sugar as said grape juice before ultrafiltration, whereby wine produced from said grape juice retentate has a decreased flavor and a lowered Labrusca Flavor Index.

2. A process for the treatment of wine produced by fermentation from grapes which produce a highly flavored wine having a high Labrusca Flavor Index, which comprises:
    effecting ultrafiltration of said wine using a semi-permeable membrane having a molecular weight cut-off of from 175 to 200 so as to permit at least a substantial proportion of low molecular weight volatile esters having a molecular weight less than 175 to 200 to pass therethrough as a filtrate while retaining in the wine essentially all colorants and sugars having a molecular weight greater than the 175 to 200 as a wine retentate, and
    concentrating the wine during the ultrafiltration to a volume of about 25 to about 75% of the initial volume of the wine by allowing about 25% to about 75% of the initial wine volume to pass through the membrane, thereby to produce as the wine retentate, a concentrated wine having essentially the same alcohol content as the wine before ultrafiltration, an intensified color and a lowered Labrusca Flavor Index.

3. The process of claim 1 or 2 wherein said ultrafiltration is effected at an ambient temperature of about 15° to about 25° C.

4. The process of claim 1 or 2 wherein said ultrafiltration is effected to a sufficient degree to decrease the Labrusca Flavour Index by at least about 50%.

5. The process of claim 1 or 2 wherein said wine is formed from Labrusca grapes.

6. The process of claim 1 or 2 wherein said wine is formed from Labrusca hybrid grapes or French hybrid grapes.

7. The process of claim 1 or 2 wherein said ultrafiltration is effected at an ambient temperature of about 15° to about 25° C. and to a sufficient degree to decrease the Labrusca Flavour Index by at least about 50%.

8. The process of claim 2 wherein said filtrate is a highly flavored wine.

\* \* \* \* \*